United States Patent
Luo

(10) Patent No.: US 10,880,355 B2
(45) Date of Patent: Dec. 29, 2020

(54) METHOD FOR PERFORMING ORIGINAL REAL-TIME VIDEO BROADCASTING

(71) Applicant: Yedi Luo, Changzhou (CN)

(72) Inventor: Yedi Luo, Changzhou (CN)

( * ) Notice: Subject to any disclaimer, the term of this patent is extended or adjusted under 35 U.S.C. 154(b) by 0 days.

(21) Appl. No.: 16/379,471

(22) Filed: Apr. 9, 2019

(65) Prior Publication Data

US 2020/0304553 A1 Sep. 24, 2020

(30) Foreign Application Priority Data

Mar. 18, 2019 (CN) .......................... 2019 1 02029702

(51) Int. Cl.
*H04L 29/06* (2006.01)
*H04N 5/225* (2006.01)
*H04N 13/279* (2018.01)
*H04N 13/167* (2018.01)

(52) U.S. Cl.
CPC ........ *H04L 65/608* (2013.01); *H04L 65/1016* (2013.01); *H04N 5/2252* (2013.01); *H04N 5/2253* (2013.01); *H04N 13/167* (2018.05); *H04N 13/279* (2018.05)

(58) Field of Classification Search
CPC ... H04L 65/608; H04L 65/1016; H04L 47/70; H04L 12/66; H04L 43/08; H04L 67/1004; H04N 5/2253; H04N 5/2252; H04N 13/167; H04N 13/279

USPC .......................................................... 709/231

See application file for complete search history.

(56) References Cited

U.S. PATENT DOCUMENTS

2016/0073023 A1* 3/2016 Rondinelli ............. G02B 13/06
　　　　　　　　　　　　　　　　　　　　　　　348/36
2020/0055195 A1* 2/2020 Ignakov .................. B25J 13/006

\* cited by examiner

*Primary Examiner* — Kristie D Shingles
(74) *Attorney, Agent, or Firm* — McClure, Qualey & Rodack, LLP

(57) ABSTRACT

The present invention discloses a method for performing original real-time video broadcasting with non-stationary panoramic video on virtual reality headset, comprising PC terminal one and PC terminal two, also a panoramic camera connected to the PC terminal one, a four-axis electromechanical structure connected to the panoramic camera, and a virtual reality headset connected to the PC terminal two. The present invention enables the panoramic camera to perform live video transmission on the virtual reality headset in low delay or real time, which will realize virtual reality of different scenarios, for example, the panoramic HD camera can be placed in the car cockpit, restoring the driving environment for the user perfectly. With real-time panoramic video transmission, user may complete the remote control of the car with the same experience. When the user swings the head back and forth or tilts the body, the four-axis electromechanical structure allows the originally fixed panoramic camera to make spatial changes to its position.

4 Claims, 4 Drawing Sheets

METHOD FOR PERFORMING ORIGINAL REAL-TIME VIDEO BROADCASTING

FIELD OF THE INVENTION

The present invention relates to the field of the real-time video broadcasting, more particularly to a method for performing original real-time video broadcasting with non-stationary panoramic video on virtual reality headset.

BACKGROUND OF THE INVENTION

Currently, most video transmission technology of the virtual reality live streaming commercially available employs RMTP or RTSP, which can only achieve high-latency panoramic video transmission with a delay between 5 seconds and 15 seconds. This greatly reduces the timeliness and usefulness of the panoramic video, which can only be used in live entertainment videos without strict time requirements.

Currently, the low-latency or real-time video transmission (less than 500 ms) technology remains in the stage of 2D planar video. Even with the experimental WEBRTC and WEBVR integration, all that can be done is to make a 2D video call in the VR virtual environment. It is not possible to present the 3D panoramic video directly by way of a low-latency video call.

In terms of content presentation, commercial applications or APPs that can directly perform low-latency or real-time video transmission to HD cameras of headsets such as HTC VIVE are not available yet.

Traditional cameras provide a panoramic view of virtual reality at a fixed point for the user, and the user's observation point in the virtual world is controlled by the virtual reality headset through the steering of the user's head. However, coordinates of this observation point are fixed and unchangeable, which runs counter to actual operation mode of the user. That is, under the existing technical conditions, what the user can see through the signal transmission is only a panoramic view from a fixed point, rather than a panoramic view from an active point. When the user swings head back or forth or tilts towards one side, the fixed point camera is not able to change its position.

SUMMARY OF THE INVENTION

In order to address the above technical problems, an object of the present invention is to provide a method for performing original real-time video broadcasting of non-stationary panoramic video on virtual reality headset.

The technical problems to be solved by the present invention are:

How to directly perform low-latency or real-time video transmission on HD cameras of headsets such as HTC VIVE.

How to make the panorama view seen by the user change when the user swings head back and forth or tilts.

The object of the present invention can be achieved by the following technical solutions:

A method for performing original real-time video broadcasting with non-stationary panoramic video on virtual reality headset, comprises PC terminal one and PC terminal two, also a panoramic camera connected to the PC terminal one, a four-axis electromechanical structure connected to the panoramic camera and a virtual reality headset connected to the PC terminal two, wherein the specific steps of the method are:

1. determining the spatial coordinates of the panoramic camera (8); the rotating joint R1, the rotating joint R2, the moving joint P1 and the moving joint P2 on the four-axis electromechanical structure form four joints, determining the spatial coordinates of the panoramic camera (8) by the fixing angles and moving distance of the four joints; wherein the PC terminal one connected to the panoramic camera (8) will first calculate the existing position of the panoramic camera (8) by Forward Kinematics according to the existing position of each joint, and then return it to the default critical point. The PC terminal two that is connected the virtual reality headset, will determine the location of the virtual reality headset in the virtual space by the three-axis positioning system of the virtual reality headset, after the user wears the virtual reality headset. Subsequently, PC terminal 2 will synchronize the spatial position of the panoramic camera (8) and the virtual position of the virtual reality headset; wherein, after determining the fixed angles and the moving distance of the four joint points, the spatial coordinates of the panoramic camera (8) is determined by the following calculation method, specifically as following: The length of the rod in the four-axis electromechanical structure is marked as a, the torsion angle of the rod is marked as α, the joint distance is marked as d, the joint rotational angle is marked as θ, calculate the value of the $\cos(\theta i)$ and mark as $C_i$, and calculate the value of $\sin(\theta i)$ and mark as $S_i$, convert them to obtain A1, A2, A3, A4, T is obtained by calculation according to the formula:

| Link | a | A | D | θ |
|---|---|---|---|---|
| 1 | 0 | 0 | 0 | $\theta_1$ |
| 2 | 0 | 90 | $d_2$ | 0 |
| 3 | 0 | 90 | 0 | $\theta_3$ |
| 4 | 0 | 0 | $d_4$ | 0 |

$$A_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix} \quad A_3 = \begin{bmatrix} c_3 & 0 & s_3 & 0 \\ s_3 & 0 & -c_3 & 0 \\ 0 & 1 & 0 & 0 \\ 0 & 0 & 0 & 1 \end{bmatrix};$$

$$A_2 = \begin{bmatrix} 1 & 0 & 0 & 0 \\ 0 & 0 & -1 & 0 \\ 0 & 1 & 0 & d_2 \\ 0 & 0 & 0 & 1 \end{bmatrix} \quad A_4 = \begin{bmatrix} 1 & 0 & 0 & 0 \\ 0 & 1 & 0 & 0 \\ 0 & 0 & 1 & d_4 \\ 0 & 0 & 0 & 1 \end{bmatrix};$$

$$T_4^0 = A_1^* A_2^* A_3^* A_4 = \begin{pmatrix} c_1 c_3 & -s_1 & c_1 s_3 & c_1 d_4 s_3 \\ c_3 s_1 & -c_1 & s_1 s_3 & d_4 s_1 s_3 \\ s_3 & 0 & -c_3 & d_2(-c_3)d_4 \\ 0 & 0 & 0 & 1 \end{pmatrix};$$

Wherein, T is a transformation matrix to determine the end of the four-axis electromechanical structure, namely, relative coordinates of the panoramic camera (8) position against the base (1) of the four-axis electromechanical structure;

2. two cameras on the front and rear side of the panoramic camera (8) are used as image collecting devices, and the collected images are fisheye type, which are respectively labeled as image one and image two and sent to the PC terminal one;

3. PC terminal one and PC terminal two are directly connected by WEBRTC communication channel, PC terminal one will collect, pack, integrate and transmit the inputted images, the WEBRTC channel uses WEBSOCKET to transmit signals for the server, and uses the server to open up the WEBRTC channel;

4. PC terminal two updates image for each frame at a fixed frame rate depending on the PC performance, the image one will be stuck to the left hemisphere and image two right one; The PC terminal two will make a hollow sphere with 3D project engine, and radius of the sphere is virtual distance 10, then the received frame-by-frame images will be mapped to the inner side of the hollow sphere;

5. adjust normal according to direction that the images are mapped by the engine, use Unity engine, set the mapping normal as −1, so that inverse left and right mapping can be corrected;

6. set the virtual perspective at the center of the sphere, and the viewing direction of the virtual perspective shall be determined by the gyroscope of the virtual reality headset;

7. transmit the spatial coordinates (x, y, z) of the panoramic camera (8) determined in step one as a standard from PC terminal one to PC terminal two, and synchronize the current spatial coordinates (x_1, y_1, z_1) of the user in the virtual world;

8. PC terminal two updates the current spatial coordinates (x_1, y_1, z_1) of the user in the virtual world according to the gyroscope which cooperates with the virtual reality headset by swings of the user's head and body;

9. PC terminal two sends the updated space coordinates (x_1, y_1, z_1) in the virtual world to the PC terminal one; and 10. PC terminal one updates the spatial coordinates where the four-axis electromechanical structure should be with inverse kinematic calculation according to the received spatial coordinates in the virtual world, and sends desired coordinates command to the four-axis electromechanical structure.

Further, the virtual angle of view of the step six is displayed and controlled by an HTC vive headset.

Further, the panoramic camera in the step one is an Insta360air camera.

Further, in step ten the desired coordinates are calculated by inverse kinematic, and the calculation result is not unique, just select one of them arbitrarily.

Further, the four-axis electromechanical structure comprises a base, a first rotating module is connected to the center of the base, the output end of the first rotating module is connected to the center of the lower end of a first connecting module, and the upper end of the first connecting module is connected at the center of the lower end surface of a Y-axis moving module, the Y-axis moving module is connected with one end of a second connecting module, the other end of the second connecting module is connected to the center of the lower surface of a X-axis moving module, the X-axis moving module and the Y-axis moving module share the same structure and are arranged perpendicular to each other; the upper surface of the X-axis moving module is connected with a second rotating module, the panoramic camera is jointed to the second rotating module.

Further, the first connecting module comprises a circular mounting plate, on the upper surface of the circular mounting plate is fixed four supporting columns arranged as a matrix, and the upper end of the supporting columns are fixed with the Y-axis moving module.

Further, the Y-axis moving module comprises a strip-shaped plate, the lower surface of the strip-shaped plate is connected to the first connecting module, the upper surface of the strip-shaped plate is provided with two parallel upper sliding slots; the upper sliding slot is slidably connected with a sliding plate, and the sliding plate is connected to the second connecting module, the sliding plate is connected to the output end of a first linear stepping motor, the first linear stepping motor is connected on one end to the upper side of the strip-shaped plate, the center of the lower surface of the strip-shaped plate is provided with a lower sliding slot, the length of the lower sliding slot are the same as that of the upper sliding slot, and a weight slider is slidably connected on the lower sliding slot, the weight slider and the sliding plate are kept at equal distance from the center of the strip-shaped plate and are symmetrically arranged; the weight slider is connected to the output end of the second linear stepping motor, and the second linear stepping motor is connected to one end on the lower surface of the strip-shaped plate that is different from the end where the first linear stepping motor is located.

Further, the second rotating module includes a supporting plate, one end of the supporting plate is connected to the X-axis moving module; the other end of the supporting plate is connected to the housing of a third linear stepping motor, to the output end of the third linear stepping motor is connected a fixing plate, throughout the entire length of the fixing plate two symmetrically arranged connecting rods penetrate and are fixed, the lower ends of both connecting rods are connected to the same fixing ring, the upper end of both the connecting rods is sleeved with a sleeve, to the lower end surface of the sleeve is coaxially fixed one end of a cylindrical spring, the other end of the cylindrical spring is connected to the upper surface of the fixing plate, and the cylindrical spring is sleeved on the connecting rod, both sleeves are connected to the same upper fixed ring by supporting rods; the upper fixed ring is located directly above the lower fixed ring, and the panoramic camera is placed between the upper fixed ring and the lower fixed ring.

Further, the second connecting module comprises four electromotion poles distributed in a matrix, and the first rotating module is a stepping motor.

The beneficial effect of the present invention is that the present invention enables the panoramic camera to perform live video transmission on the virtual reality headset in low delay or real time (500 ms or less), which will realize virtual reality in different scenarios, for example, the panoramic HD camera can be placed in the car cockpit, restoring the driving environment for the user perfectly. With real-time panoramic video transmission, users can make remote control of the car with the same experience. When the user swings the head back and forth or tilts the body, the four-axis electromechanical structure allows the originally fixed panoramic camera to make spatial changes to its position.

BRIEF DESCRIPTION OF DRAWINGS

The present invention will now be further described with reference to the accompanying drawings.

DETAILED DESCRIPTION OF THE ILLUSTRATED EMBODIMENT

The drawings include the following components:
1—Base;
2—First rotating module;
3—First connecting module;
301—Mounting circular plate;
302—Supporting column;
4—Y-axis moving module;
401—Strip-shaped plate;
402—Upper sliding slot;
403—Sliding plate;
404—First linear stepping motor;
405—Lower sliding slot;
406—Weight slider;
407—Second connecting module;
5—Second connecting module;
6—X-axis moving module;
7—Second rotating module;
701—Supporting plate;
702—Third linear stepping motor;
703—Fixing plate;
704—Connecting rod;
705—Lower fixing ring;
706—Sleeve;
707—Upper fixing ring;
8—Panoramic camera.

The technical solutions in the embodiments of the present invention are clearly and completely described in the following with reference to the accompanying drawings in the embodiments of the present invention. It is obvious that the described embodiments are only a part of the embodiments of the present invention, but not all embodiments. All other embodiments obtained by those skilled in the art based on the embodiments of the present invention without creative efforts are all included within the scope of the present invention.

Figure 1:
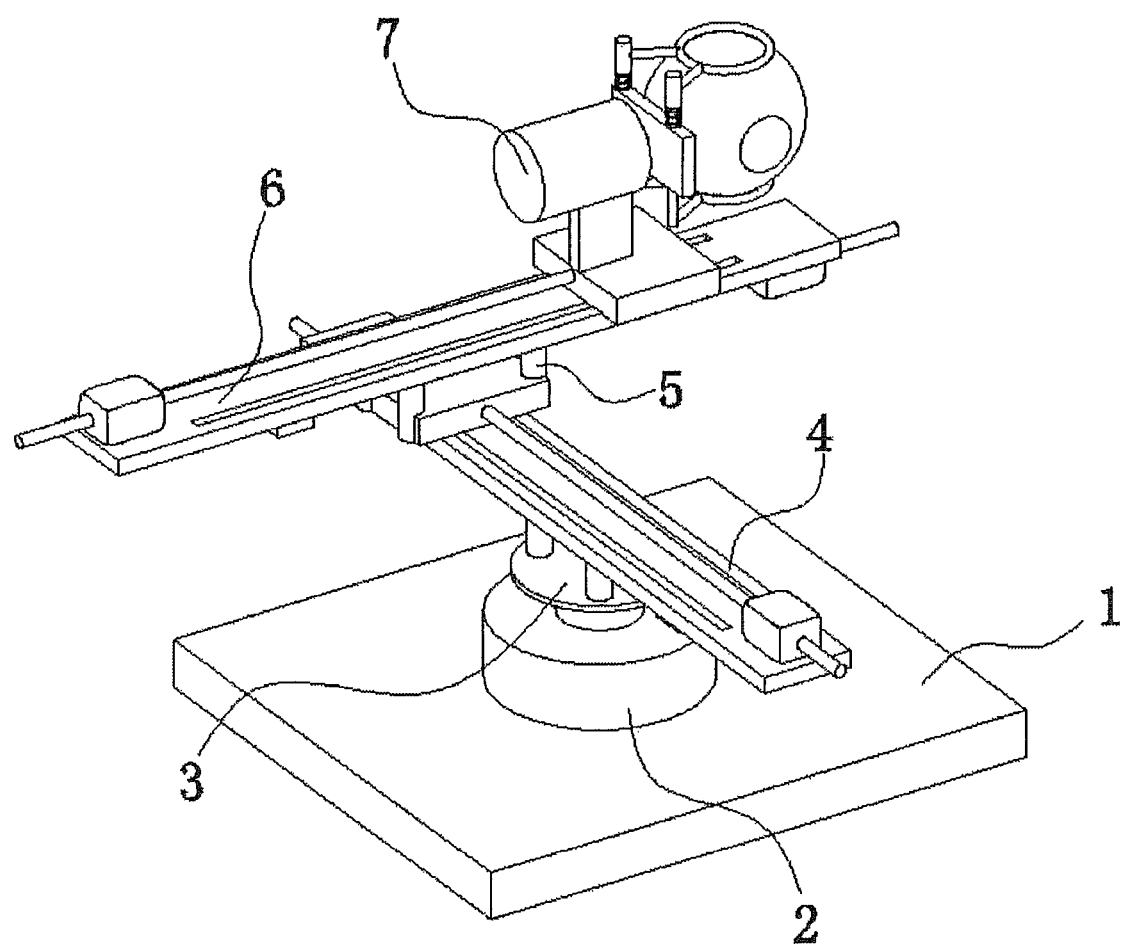
FIG. 1 is a perspective view of a four-axis electromechanical structure in the present invention.
Figure 2:
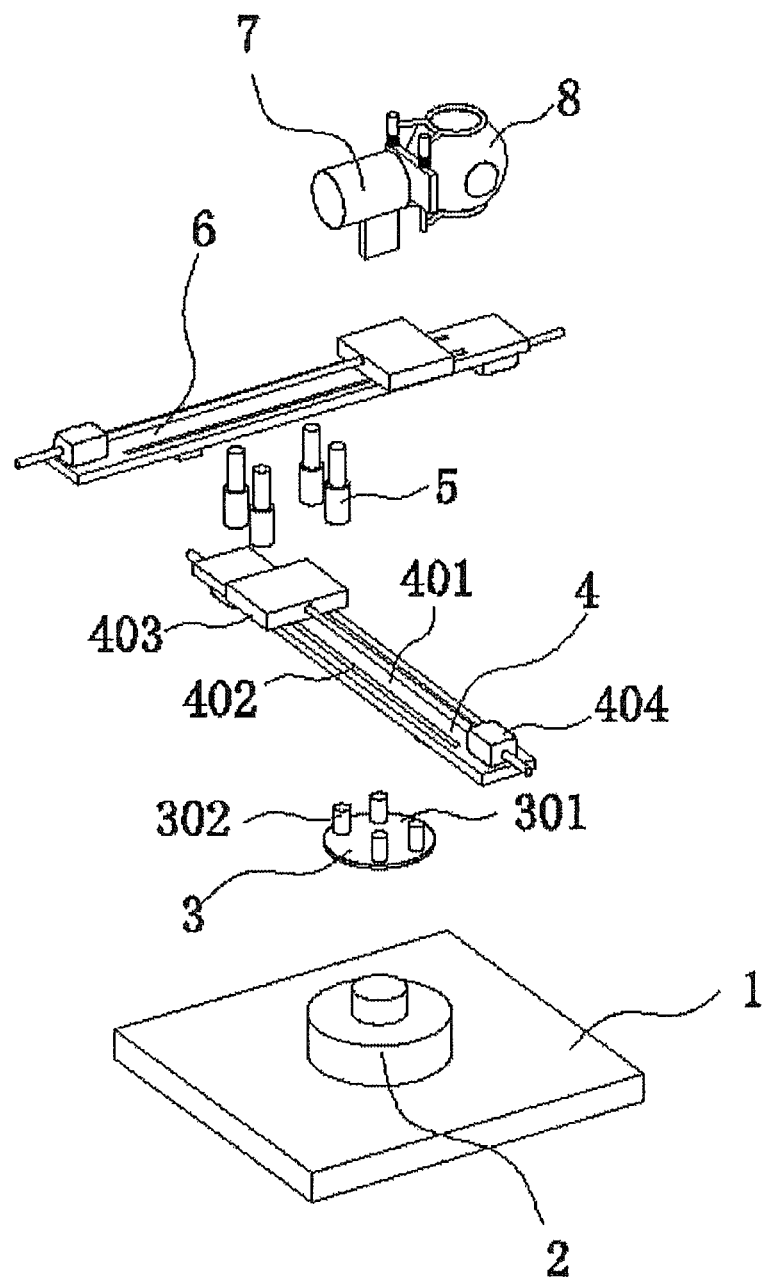
FIG. 2 is an exploded view of the four-axis electromechanical structure of the present invention.
Figure 3:
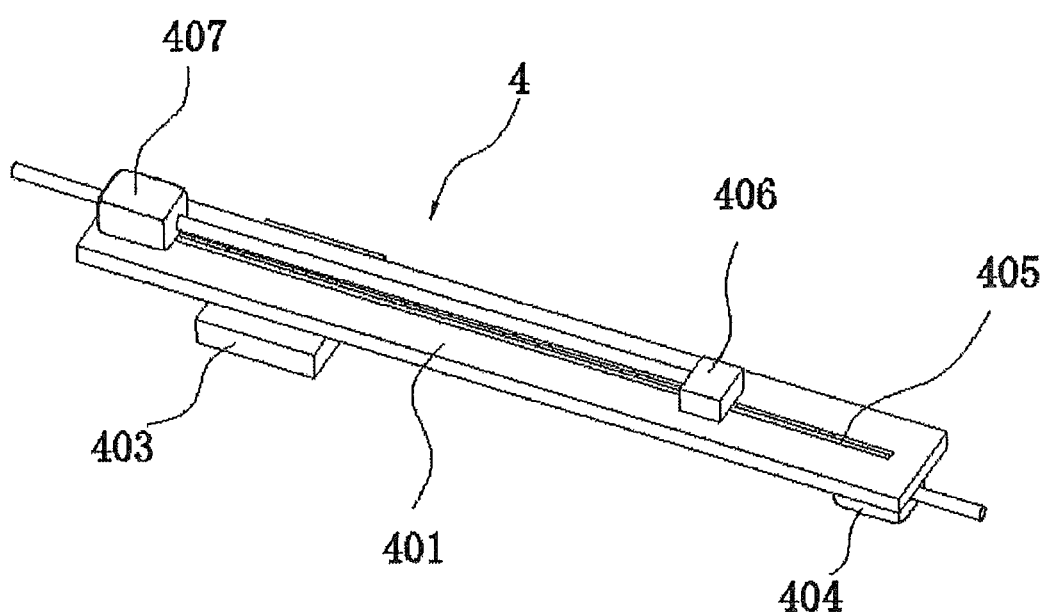
FIG. 3 is a perspective view of the rear side of the Y-axis moving module in the four-axis electromechanical structure.
Figure 4:
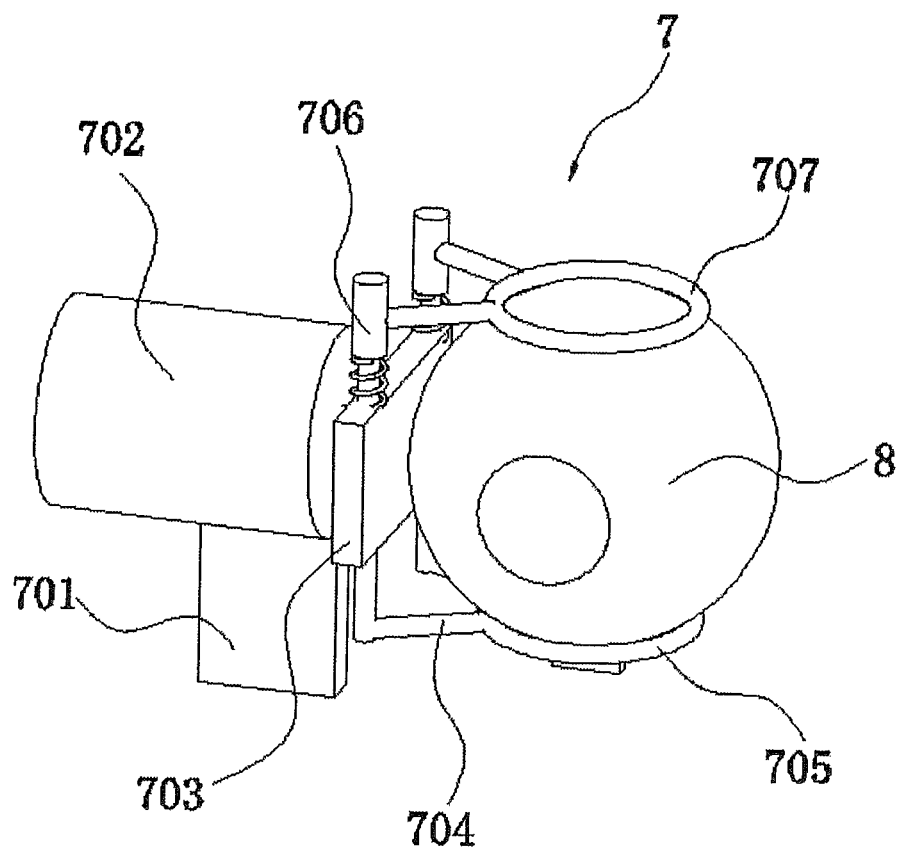
FIG. 4 is a schematic view showing the structure of a second rotating module in a four-axis electromechanical structure.

Please refer to FIGS. 1-4, the present embodiment provides a method for performing original real-time video broadcasting with non-stationary panoramic video on virtual reality headset, comprising PC terminal one and PC terminal two, also comprising a panoramic camera 8 connected to the PC terminal one, a four-axis electromechanical structure connected to the panoramic camera 8 and a virtual reality headset connected to the PC terminal two, wherein the specific steps of the method are:

1. determining the spatial coordinates of the panoramic camera 8; the rotating joint R1, the rotating joint R2, the moving joint P1 and the moving joint P2 on the four-axis electromechanical structure form four joints, determining the spatial coordinates of the panoramic camera 8 by the fixing angles and moving distance of the four joints; wherein the PC terminal one connected to the panoramic camera 8 will first calculate the existing position of the panoramic camera 8 by Forward Kinematics according to the existing position of each joint, and then return it to the default critical point; the PC terminal two that is connected the virtual reality headset, will determine the location of the virtual reality headset in the virtual space by the three-axis positioning system of the virtual reality headset, after the user wears the virtual reality headset. Subsequently, PC terminal 2 will synchronize the spatial position of the panoramic camera 8 and the virtual position of the virtual reality headset; Wherein, after determining the fixed angles and the moving distance of the four joint points, the spatial coordinates of the panoramic camera 8 is determined by the following calculation method, specifically as following: the length of the rod in the four-axis electromechanical structure is marked as a, the torsion angle of the rod is marked as $\alpha$, the joint distance is marked as d, the joint rotational angle is marked as $\theta$, calculate the value of the $\cos(\theta i)$ and mark as $C_i$, and calculate the value of $\sin(\theta i)$ and mark as $S_i$, convert them to obtain A1, A2, A3, A4, T is obtained by calculation according to the formula:

| Link | a | A | d | $\theta$ |
| --- | --- | --- | --- | --- |
| 1 | 0 | 0 | 0 | $\theta_1$ |
| 2 | 0 | 90 | $d_2$ | 0 |
| 3 | 0 | 90 | 0 | $\theta_3$ |
| 4 | 0 | 0 | $d_4$ | 0 |

$$A_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix} \quad A_3 = \begin{bmatrix} c_3 & 0 & s_3 & 0 \\ s_3 & 0 & -c_3 & 0 \\ 0 & 1 & 0 & 0 \\ 0 & 0 & 0 & 1 \end{bmatrix};$$

$$A_2 = \begin{bmatrix} 1 & 0 & 0 & 0 \\ 0 & 0 & -1 & 0 \\ 0 & 1 & 0 & d_2 \\ 0 & 0 & 0 & 1 \end{bmatrix} \quad A_4 = \begin{bmatrix} 1 & 0 & 0 & 0 \\ 0 & 1 & 0 & 0 \\ 0 & 0 & 1 & d_4 \\ 0 & 0 & 0 & 1 \end{bmatrix};$$

$$T_4^0 = A_1^* A_2^* A_3^* A_4 = \begin{pmatrix} c_1 c_3 & -s_1 & c_1 s_3 & c_1 d_4 s_3 \\ c_3 s_1 & -c_1 & s_1 s_3 & d_4 s_1 s_3 \\ s_3 & 0 & -c_3 & d_2(-c_3)d_4 \\ 0 & 0 & 0 & 1 \end{pmatrix};$$

wherein T is the terminal of the four-axis electromechanical structure, and that is the position of the panoramic camera corresponds to a transformation matrix of relative coordinates of the base of the four-axis electromechanical structure;

2. the front and back cameras of the panoramic camera are used as input image devices, and the extracted images by which are fisheye type, which are respectively labeled as image one and image two and are sent to the PC terminal one;

3. PC terminal one and PC terminal two are directly connected through the WEBRTC channel, PC terminal one is used to collect, package, integrate and transmit the input images, the WEBRTC channel uses WEBSOCKET to transmit signaling for the server, and uses the server to open the WEBRTC channel;

4. PC terminal two updates the each frame of images at a fixed frame rate according to PC performance, the image one is the left hemisphere internal texture, the image two is the right hemisphere internal texture; The PC terminal two uses the 3D project engine to manufacture a hollow sphere, and the sphere radius is virtual distance 10, then the received frame-by-frame images are attached on the inside of the hollow sphere as textures;

5. the normal is adjusted according to the direction of the engine processing texture, Unity engine is selected, the normal of the texture is set as −1, so that the original left and right reverse texture is corrected;

6. the virtual angle of view is set at the center of the sphere, and the view direction of the virtual angle of view is determined by the gyroscope of the virtual reality headset;

7. the spatial coordinates (x, y, z) of the panoramic camera determined in the step one as a standard is transferred from the PC terminal one to the PC terminal two, then the current spatial coordinates (x_1, y_1, z_1) of the user in the virtual world is synchronized;

8. the PC terminal two updates the current spatial coordinates (x_1, y_1, z_1) of the user in the virtual world according to the gyroscope, and the gyroscope is fitted with the virtual reality headset according to the swings of the user's head and body;

9. the PC terminal two sends the updated space coordinates (x_1, y_1, z_1) of the virtual world to the PC terminal one; and 10. the PC terminal updates the spatial coordinates that the four-axis electromechanical structure needs to reach according to the received spatial coordinates of the virtual world, calculates by the inverse kinematic and issues command coordinates to the four-axis electromechanical structure.

In step six, the virtual angle of view is displayed and controlled by an HTC vive headset, and other headsets such as the Oculus Rift or Google's daydream device can be used.

In step one, the panoramic camera (8) is an Insta360air camera, and can also be other panoramic cameras.

In step ten the desired coordinates are calculated by inverse kinematic, and the calculation result is not unique, just select one of them arbitrarily.

In the present invention, the panoramic camera can perform live video transmission of the virtual reality headset in low delay or in real time (500 ms or less), which may realize virtual reality in different scenarios, for example, the panoramic HD camera can be placed in the car cockpit, restoring the driving environment for the user perfectly. With real-time panoramic video transmission, users complete remote control of the car with the same experience. When the user swings the head back and forth or tilts the body, the four-axis electromechanical structure allows the originally fixed panoramic camera to make spatial changes to its position.

The four-axis electromechanical structure comprises a base 1, a first rotating module 2 is connected to the center of the base 1, the first rotating module 2 is a stepping motor, and acts as a rotating joint R1 to realize the rotation of the panoramic camera 8 in the horizontal plane, and the output end of the first rotating module 2 is connected to the center of the lower end of a first connecting module 3.

The first connecting module 3 comprises a mounting circular plate 301, the upper end surface of the mounting circular plate 301 is connected with four supporting columns 302 arranged as a matrix, the upper end of the supporting column 302 is connected to the Y-axis moving module 4, and the Y-axis moving module 4 acts as the moving joint P2.

The upper end of the first connecting module 3 is connected to the center of the lower end surface of a Y-axis moving module 4, the Y-axis moving module 4 is connected to one end of a second connecting module 5, which comprises four electromotion poles, acting as moving joint P1, the other end of the second connecting module 5 is connected to the center of the lower surface of a X-axis moving module 6.

The Y-axis moving module 4 comprises a strip-shaped plate 401, the lower end surface of the strip-shaped plate 401 is connected to the first connecting module 3, the upper end surface of the strip-shaped plate 401 is provided with two parallel upper sliding slots 402; the upper sliding slot 402 is slidably connected with a sliding plate 403, and the sliding plate 403 is connected to the second connecting module 5, the sliding plate 403 is connected to the output end of a first linear stepping motor 404, the first linear stepping motor (404) is connected one end of the upper end surface of the strip-shaped plate 401, the center of the lower end surface of the strip-shaped plate 401 is provided with a lower sliding slot 405, the length of the lower sliding slot 405 are the same as that of the upper sliding slot 402, and the lower sliding slot 405 is slidably connected with a weight slider 406. The first linear stepping motor 404 and the second linear stepping motor 407 are controlled by the same signal, the weight slider 406 and the sliding plate 403 are kept at the same distance from the center of the strip-shaped plate 401 and are symmetrically arranged; the weight slider 406 can pass through the supporting columns 302, and the weight slider of the X-axis moving module 6 can pass through the electromotion poles. The weight slider 406 is connected to the output end of the second connecting module 407, and the second connecting module 407 is connected to one end of the lower surface of the strip-shaped plate 401 away from the first linear stepping motor 404.

The X-axis moving module 6 and the Y-axis moving module 4 share the same structure and are arranged perpendicular to each other, the upper end surface of the X-axis moving module 6 is connected to a second rotating module 7, and the panoramic camera 8 is jointed to the second rotating module 7. The second rotating module 7 comprises a support plate 701, one end of the support plate 701 is connected to the X-axis moving module 6, the other end of the supporting plate 701 is connected to the housing of a third linear stepping motor 702; and the third linear stepping motor 702 is used as the rotating joint R2, the output end of the third linear stepping motor 702 is connected to a fixing plate 703, the fixing plate 703 is connected with two symmetrically arranged connecting rods 704, the lower ends of the connecting rods 704 are connected to a same fixing ring 705, the upper end of the two connecting rods 704 is sleeved with a sleeve 706, the lower end surface of the sleeve 706 is coaxially connected to one end of the cylindrical spring. The other end of the cylindrical spring is connected to the upper end surface of the fixed plate 703, and the cylindrical spring is sleeved on the connecting rod 704. The sleeve 706 can be pulled up and down, and the cylindrical spring gives a downward pulling force by pulling the sleeve 706 downward. The two sleeves 706 are all connected to the same upper fixed ring 707 by the supporting rod; the upper fixed ring 707 is located directly above the lower fixed ring 705, and the panoramic camera 8 is placed between the upper fixed ring 707 and the lower fixed ring 705. Pull the upper fixed ring 707 up, and the distance between the upper fixed ring 707 and the lower fixed ring 705 is increased, so is the space between the upper fixed ring 707 and the lower fixed ring 705, then the panoramic camera 8 can be placed and conveniently installed and disassembled.

The working process of the four-axis electromechanical structure is as follows:

Take horizontal plane as the plane where the X and Y axes are located, and the direction of the vertical horizontal plane is the Z axis. The first rotating module 2 controls the angle that the panoramic camera 8 rotates in the horizontal direction according to the signals, in the meantime the second connecting module 5 controls the four electromotion poles according to the signals, and thereby controls the moving distance of the panoramic camera 8 on the Z axis. The Y-axis moving module 4 and the X-axis moving module 6 respectively control the moving distance of the panoramic camera 8 in the X-axis and Y-axis directions according to the respective signals. The second rotating module 7 controls the angle of the panoramic camera 8 rotates in the vertical direction. Meanwhile, the Y-axis moving module 4 and the X-axis moving module 6 are both provided with a weight structure, the center of gravity is kept stable by adjusting the position of the weight slider 406, thereby ensuring the stability of the panoramic camera 8 during maneuvering.

The above is only exemplary and description of the structure of the present invention, and those skilled in the art can make various modifications or additions to the specific embodiments described or replace them in a similar manner, as long as they do not deviate from the structure of the invention or the scope defined by the claims, the modifications or additions are all should fall in the scope of the invention.

The invention claimed is:

1. A method for performing original real-time video broadcasting with non-stationary panoramic video on virtual reality headset having a PC terminal one and a PC terminal two, characterized in that, a panoramic camera (8) is connected to the PC terminal one, a four-axis electromechanical structure is connected to the panoramic camera (8) and a virtual reality headset is connected to the PC terminal two, the method comprising:

determining the spatial coordinates of the panoramic camera (8); the rotating joint (R1), the rotating joint (R2), the moving joint (P1) and the moving joint (P2) on the four-axis electromechanical structure form four joints, determining the spatial coordinates of the panoramic camera (8) by the fixing angles and moving distance of the four joints, wherein:

the PC terminal one connected to the panoramic camera (8) will first calculate the existing position of the panoramic camera (8) by Forward Kinematics according to the existing position of each joint, and then return it to the default critical point; and the PC terminal two that is connected the virtual reality headset, will determine the location of the virtual reality headset in the virtual space by the three-axis positioning system of the virtual reality headset, after the user wears the virtual reality headset;

subsequently, PC terminal two will synchronize the spatial position of the panoramic camera (8) and the virtual position of the virtual reality headset;

after determining the fixed angles and the moving distance of the four joint points, the spatial coordinates of the panoramic camera (8) is determined by the following calculation method, specifically as follows:

the length of the rod in the four-axis electromechanical structure is marked as a, the torsion angle of the rod is marked as a, the joint distance is marked as d, the joint rotational angle is marked as θ, calculate the value of the $\cos(\theta_i)$ and mark as $C_i$, and calculate the value of $\sin(\theta_i)$ and mark as $S_i$, convert them to obtain A1, A2, A3, A4, T is obtained by calculation according to the expression:

| Link | A | α | d | θ |
|---|---|---|---|---|
| 1 | 0 | 0 | 0 | θ1 |
| 2 | 0 | 90 | d2 | 0 |
| 3 | 0 | 90 | 0 | θ3 |
| 4 | 0 | 0 | d4 | 0 |

$$A_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix} A_3 = \begin{bmatrix} c_3 & 0 & s_3 & 0 \\ s_3 & 0 & -c_3 & 0 \\ 0 & 1 & 0 & 0 \\ 0 & 0 & 0 & 1 \end{bmatrix};$$

$$A_2 = \begin{bmatrix} 1 & 0 & 0 & 0 \\ 0 & 0 & -1 & 0 \\ 0 & 1 & 0 & d_2 \\ 0 & 0 & 0 & 1 \end{bmatrix} A_4 = \begin{bmatrix} 1 & 0 & 0 & 0 \\ 0 & 1 & 0 & 0 \\ 0 & 0 & 1 & d_4 \\ 0 & 0 & 0 & 1 \end{bmatrix};$$

$$T_4^0 = A_1^* A_2^* A_3^* A_4 = \begin{pmatrix} c_1 c_3 & -s_1 & c_1 s_3 & c_1 d_4 s_3 \\ c_3 s_1 & -c_1 & s_1 s_3 & d_4 s_1 s_3 \\ s_3 & 0 & -c_3 & d_2(-c_3)d_4 \\ 0 & 0 & 0 & 1 \end{pmatrix};$$

wherein, T is a transformation matrix to determine the end of the four-axis electromechanical structure, namely, relative coordinates of the panoramic camera (8) position against the base (1) of the four-axis electromechanical structure;

using two lenses as image collecting devices, and the collected images are fisheye type, which are respectively labeled as image one and image two and sent to the PC terminal one;

directly connecting the PC terminal one and the PC terminal two by WEBRTC communication channel, PC terminal one will collect, pack, integrate and transmit the inputted images, the WEBRTC channel uses WEB SOCKET to transmit signals for the server, and uses the server to open up the WEBRTC channel;

updating, by PC terminal two, image for each frame at a fixed frame rate depending on the PC performance, the image one will be stuck to the left hemisphere and image two right one; the PC terminal two will make a hollow sphere with 3D project engine, and radius of the sphere is virtual distance (10), then the received frame-by-frame images will be mapped to the inner side of the hollow sphere;

adjusting normal according to direction that the images are mapped by a Unity engine, set the mapping normal as −1, so that inverse left and right mapping can be corrected;

setting the virtual perspective at the center of the sphere, and the viewing direction of the virtual perspective shall be determined by a gyroscope of the virtual reality headset;

transmitting the spatial coordinates (x, y, z) of the panoramic camera (8) determined in step one as a standard from PC terminal one to PC terminal two, and synchronize the current spatial coordinates (x_1, y_1, z_1) of the user in the virtual world;

updating, by PC terminal two, the current spatial coordinates (x_1, y_1, z_1) of the user in the virtual world according to the gyroscope which cooperates with the virtual reality headset by swings of the user's head and body;

sending, by PC terminal two, the updated space coordinates (x_1, y_1, z_1) in the virtual world to the PC terminal one;

updating, by PC terminal one, the spatial coordinates where the four-axis electromechanical structure should be with inverse kinematic calculation according to the received spatial coordinates in the virtual world, and sends desired coordinates command to the four-axis electromechanical structure, wherein the virtual perspective in step six is displayed and controlled by display, wherein, the desired coordinates are calculated by inverse kinematic, and the calculation result is not unique, just select one of them arbitrarily, and wherein, the four-axis electromechanical structure comprises a base (1), a first rotating module (2) is fixed to the center of the base (1), the output end of the first rotating module (2) is connected to the center of the lower end of a first connecting module (3), and the upper end of the first connecting module (3) is connected at the center of the lower surface of a Y-axis moving module (4), the Y-axis moving module (4) is connected with one end of a second connecting module (5), while the other end of the second connecting module (5) is connected to the center of the lower surface of a X-axis moving module (6), the X-axis moving module (6) and the Y-axis moving module (4) share the same construction and are arranged perpendicular to each other; the upper surface of the X-axis moving module (6) is connected with a second rotating module (7), and a panoramic camera (8) is jointed to the second rotating module (7), wherein, the first connecting module (3) comprises a circular mounting plate (301), on the upper surface of the circular mounting plate (301) is fixed with four supporting columns (302) arranged as a matrix, and the upper end of the supporting columns (302) are fixed with the Y-axis moving module (4).

2. A method for performing original real-time video broadcasting with non-stationary panoramic video on virtual reality headset having a PC terminal one and a PC terminal two, characterized in that, a panoramic camera (8) is connected to the PC terminal one, a four-axis electromechanical structure is connected to the panoramic camera (8) and a virtual reality headset is connected to the PC terminal two, the method comprising:

determining the spatial coordinates of the panoramic camera (8); the rotating joint (R1), the rotating joint (R2), the moving joint (P1) and the moving joint (P2) on the four-axis electromechanical structure form four joints, determining the spatial coordinates of the panoramic camera (8) by the fixing angles and moving distance of the four joints, wherein:

the PC terminal one connected to the panoramic camera (8) will first calculate the existing position of the panoramic camera (8) by Forward Kinematics according to the existing position of each joint, and then return it to the default critical point; and the PC terminal two that is connected the virtual reality headset, will determine the location of the virtual reality headset in the virtual space by the three-axis positioning system of the virtual reality headset, after the user wears the virtual reality headset;

subsequently, PC terminal two will synchronize the spatial position of the panoramic camera (8) and the virtual position of the virtual reality headset;

after determining the fixed angles and the moving distance of the four joint points, the spatial coordinates of the panoramic camera (8) is determined by the following calculation method, specifically as follows:

the length of the rod in the four-axis electromechanical structure is marked as a, the torsion angle of the rod is marked as a, the joint distance is marked as d, the joint rotational angle is marked as θ, calculate the value of the $\cos(\theta i)$ and mark as $C_i$, and calculate the value of the $\sin(\theta i)$ and mark as $S_i$, convert them to obtain A1, A2, A3, A4, T is obtained by calculation according to the expression:

| Link | A | α | d | θ |
|------|---|-----|-----|-----|
| 1 | 0 | 0 | 0 | θ1 |
| 2 | 0 | 90 | d2 | 0 |
| 3 | 0 | 90 | 0 | θ3 |
| 4 | 0 | 0 | d4 | 0 |

$$A_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix} A_3 = \begin{bmatrix} c_3 & 0 & s_3 & 0 \\ s_3 & 0 & -c_3 & 0 \\ 0 & 1 & 0 & 0 \\ 0 & 0 & 0 & 1 \end{bmatrix};$$

$$A_2 = \begin{bmatrix} 1 & 0 & 0 & 0 \\ 0 & 0 & -1 & 0 \\ 0 & 1 & 0 & d_2 \\ 0 & 0 & 0 & 1 \end{bmatrix} A_4 = \begin{bmatrix} 1 & 0 & 0 & 0 \\ 0 & 1 & 0 & 0 \\ 0 & 0 & 1 & d_4 \\ 0 & 0 & 0 & 1 \end{bmatrix};$$

$$T_4^0 = A_1^* A_2^* A_3^* A_4 = \begin{pmatrix} c_1 c_3 & -s_1 & c_1 s_3 & c_1 d_4 s_3 \\ c_3 s_1 & -c_1 & s_1 s_3 & d_4 s_1 s_3 \\ s_3 & 0 & -c_3 & d_2(-c_3)d_4 \\ 0 & 0 & 0 & 1 \end{pmatrix};$$

wherein, T is a transformation matrix to determine the end of the four-axis electromechanical structure, namely, relative coordinates of the panoramic camera (8) position against the base (1) of the four-axis electromechanical structure;

using two lenses as image collecting devices, and the collected images are fisheye type, which are respectively labeled as image one and image two and sent to the PC terminal one;

directly connecting the PC terminal one and the PC terminal two by WEBRTC communication channel, PC terminal one will collect, pack, integrate and transmit the inputted images, the WEBRTC channel uses WEB SOCKET to transmit signals for the server, and uses the server to open up the WEBRTC channel;

updating, by PC terminal two, image for each frame at a fixed frame rate depending on the PC performance, the image one will be stuck to the left hemisphere and image two right one; the PC terminal two will make a hollow sphere with 3D project engine, and radius of the sphere is virtual distance (10), then the received frame-by-frame images will be mapped to the inner side of the hollow sphere;

adjusting normal according to direction that the images are mapped by a Unity engine, set the mapping normal as −1, so that inverse left and right mapping can be corrected;

setting the virtual perspective at the center of the sphere, and the viewing direction of the virtual perspective shall be determined by a gyroscope of the virtual reality headset;

transmitting the spatial coordinates (x, y, z) of the panoramic camera (8) determined in step one as a standard from PC terminal one to PC terminal two, and synchronize the current spatial coordinates (x_1, y_1, z_1) of the user in the virtual world;

updating, by PC terminal two, the current spatial coordinates ($x\_1$, $y\_1$, $z\_1$) of the user in the virtual world according to the gyroscope which cooperates with the virtual reality headset by swings of the user's head and body;

sending, by PC terminal two, the updated space coordinates ($x\_1$, $y\_1$, $z\_1$) in the virtual world to the PC terminal one;

updating, by PC terminal one, the spatial coordinates where the four-axis electromechanical structure should be with inverse kinematic calculation according to the received spatial coordinates in the virtual world, and sends desired coordinates command to the four-axis electromechanical structure, wherein the virtual perspective in step six is displayed and controlled by display, wherein, the desired coordinates are calculated by inverse kinematic, and the calculation result is not unique, just select one of them arbitrarily, and wherein, the four-axis electromechanical structure comprises a base (1), a first rotating module (2) is fixed to the center of the base (1), the output end of the first rotating module (2) is connected to the center of the lower end of a first connecting module (3), and the upper end of the first connecting module (3) is connected at the center of the lower surface of a Y-axis moving module (4), the Y-axis moving module (4) is connected with one end of a second connecting module (5), while the other end of the second connecting module (5) is connected to the center of the lower surface of a X-axis moving module (6), the X-axis moving module (6) and the Y-axis moving module (4) share the same construction and are arranged perpendicular to each other; the upper surface of the X-axis moving module (6) is connected with a second rotating module (7), and a panoramic camera (8) is jointed to the second rotating module (7), wherein the virtual perspective in step six is displayed and controlled by an HTC vive display, wherein the panoramic camera (8) in step one is an Insta360air camera, wherein, the desired coordinates are calculated by inverse kinematic, and the calculation result is not unique, just select one of them arbitrarily, and wherein, the four-axis electromechanical structure comprises a base (1), a first rotating module (2) is fixed to the center of the base (1), the output end of the first rotating module (2) is connected to the center of the lower end of a first connecting module (3), and the upper end of the first connecting module (3) is connected at the center of the lower surface of a Y-axis moving module (4), the Y-axis moving module (4) is connected with one end of a second connecting module (5), while the other end of the second connecting module (5) is connected to the center of the lower surface of a X-axis moving module (6), the X-axis moving module (6) and the Y-axis moving module (4) share the same construction and are arranged perpendicular to each other; the upper surface of the X-axis moving module (6) is connected with a second rotating module (7), and a panoramic camera (8) is jointed to the second rotating module (7), wherein, the Y-axis moving module (4) comprises a strip-shaped plate (401), the lower surface of the strip-shaped plate (401) is connected to the first connecting module (3), the upper surface of the strip-shaped plate (401) is provided with two parallel upper sliding slots (402); the upper sliding slot (402) is slidably connected with a sliding plate (403), and the sliding plate (403) is connected to the second connecting module (5), the sliding plate (403) is connected to the output end of a first linear stepping motor (404), the first linear stepping motor (404) is connected on one end to the upper side of the strip-shaped plate (401), the center of the lower surface of the strip-shaped plate (401) is provided with a lower sliding slot (405), the length of the lower sliding slot (405) are the same as that of the upper sliding slot (402), and a weight slider (406) is slidably connected on the lower sliding slot (405), the weight slider (406) and the sliding plate (403) are kept at equal distance from the center of the strip-shaped plate (401) and are symmetrically arranged; the weight slider (406) is connected to the output end of the second linear stepping motor (407), and the second linear stepping motor (407) is connected to one end on the lower surface of the strip-shaped plate (401) that is different from the end where the first linear stepping motor (404) is located.

3. The method for performing original real-time video broadcasting with non-stationary panoramic video on virtual reality headset of claim 2, wherein, the second connecting module (5) comprises four electromotion poles distributed in a matrix, and the first rotating module (2) is a stepping motor.

4. A method for performing original real-time video broadcasting with non-stationary panoramic video on virtual reality headset having a PC terminal one and a PC terminal two, characterized in that, a panoramic camera (8) is connected to the PC terminal one, a four-axis electromechanical structure is connected to the panoramic camera (8) and a virtual reality headset is connected to the PC terminal two, the method comprising:

determining the spatial coordinates of the panoramic camera (8); the rotating joint (R1), the rotating joint (R2), the moving joint (P1) and the moving joint (P2) on the four-axis electromechanical structure form four joints, determining the spatial coordinates of the panoramic camera (8) by the fixing angles and moving distance of the four joints, wherein:

the PC terminal one connected to the panoramic camera (8) will first calculate the existing position of the panoramic camera (8) by Forward Kinematics according to the existing position of each joint, and then return it to the default critical point; and the PC terminal two that is connected the virtual reality headset, will determine the location of the virtual reality headset in the virtual space by the three-axis positioning system of the virtual reality headset, after the user wears the virtual reality headset;

subsequently, PC terminal two will synchronize the spatial position of the panoramic camera (8) and the virtual position of the virtual reality headset;

after determining the fixed angles and the moving distance of the four joint points, the spatial coordinates of the panoramic camera (8) is determined by the following calculation method, specifically as follows:

the length of the rod in the four-axis electromechanical structure is marked as a, the torsion angle of the rod is marked as a, the joint distance is marked as d, the joint rotational angle is marked as θ, calculate the value of the $\cos(\theta i)$ and mark as $C_i$, and calculate the value of $\sin(\theta i)$ and mark as $S_i$, convert them to obtain A1, A2, A3, A4, T is obtained by calculation according to the expression:

| Link | A | α | d | θ |
|---|---|---|---|---|
| 1 | 0 | 0 | 0 | θ1 |
| 2 | 0 | 90 | d2 | 0 |
| 3 | 0 | 90 | 0 | θ3 |
| 4 | 0 | 0 | d4 | 0 |

$$A_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix} \quad A_3 = \begin{bmatrix} c_3 & 0 & s_3 & 0 \\ s_3 & 0 & -c_3 & 0 \\ 0 & 1 & 0 & 0 \\ 0 & 0 & 0 & 1 \end{bmatrix};$$

$$A_2 = \begin{bmatrix} 1 & 0 & 0 & 0 \\ 0 & 0 & -1 & 0 \\ 0 & 1 & 0 & d_2 \\ 0 & 0 & 0 & 1 \end{bmatrix} \quad A_4 = \begin{bmatrix} 1 & 0 & 0 & 0 \\ 0 & 1 & 0 & 0 \\ 0 & 0 & 1 & d_4 \\ 0 & 0 & 0 & 1 \end{bmatrix};$$

$$T_4^0 = A_1^* A_2^* A_3^* A_4 = \begin{pmatrix} c_1 c_3 & -s_1 & c_1 s_3 & c_1 d_4 s_3 \\ c_3 s_1 & -c_1 & s_1 s_3 & d_4 s_1 s_3 \\ s_3 & 0 & -c_3 & d_2(-c_3)d_4 \\ 0 & 0 & 0 & 1 \end{pmatrix};$$

wherein, T is a transformation matrix to determine the end of the four-axis electromechanical structure, namely, relative coordinates of the panoramic camera (8) position against the base (1) of the four-axis electromechanical structure;

using two lenses as image collecting devices, and the collected images are fisheye type, which are respectively labeled as image one and image two and sent to the PC terminal one;

directly connecting the PC terminal one and the PC terminal two by WEBRTC communication channel, PC terminal one will collect, pack, integrate and transmit the inputted images, the WEBRTC channel uses WEB SOCKET to transmit signals for the server, and uses the server to open up the WEBRTC channel;

updating, by PC terminal two, image for each frame at a fixed frame rate depending on the PC performance, the image one will be stuck to the left hemisphere and image two right one; the PC terminal two will make a hollow sphere with 3D project engine, and radius of the sphere is virtual distance (10), then the received frame-by-frame images will be mapped to the inner side of the hollow sphere;

adjusting normal according to direction that the images are mapped by a Unity engine, set the mapping normal as −1, so that inverse left and right mapping can be corrected;

setting the virtual perspective at the center of the sphere, and the viewing direction of the virtual perspective shall be determined by a gyroscope of the virtual reality headset;

transmitting the spatial coordinates (x, y, z) of the panoramic camera (8) determined in step one as a standard from PC terminal one to PC terminal two, and synchronize the current spatial coordinates (x_1, y_1, z_1) of the user in the virtual world;

updating, by PC terminal two, the current spatial coordinates (x_1, y_1, z_1) of the user in the virtual world according to the gyroscope which cooperates with the virtual reality headset by swings of the user's head and body;

sending, by PC terminal two, the updated space coordinates (x_1, y_1, z_1) in the virtual world to the PC terminal one;

updating, by PC terminal one, the spatial coordinates where the four-axis electromechanical structure should be with inverse kinematic calculation according to the received spatial coordinates in the virtual world, and sends desired coordinates command to the four-axis electromechanical structure, wherein the virtual perspective in step six is displayed and controlled by display, wherein the desired coordinates are calculated by inverse kinematic, and the calculation result is not unique, just select one of them arbitrarily, and wherein, the four-axis electromechanical structure comprises a base (1), a first rotating module (2) is fixed to the center of the base (1), the output end of the first rotating module (2) is connected to the center of the lower end of a first connecting module (3), and the upper end of the first connecting module (3) is connected at the center of the lower surface of a Y-axis moving module (4), the Y-axis moving module (4) is connected with one end of a second connecting module (5), while the other end of the second connecting module (5) is connected to the center of the lower surface of a X-axis moving module (6), the X-axis moving module (6) and the Y-axis moving module (4) share the same construction and are arranged perpendicular to each other; the upper surface of the X-axis moving module (6) is connected with a second rotating module (7), and a panoramic camera (8) is jointed to the second rotating module (7), wherein, the second rotating module (7) comprises a supporting plate (701), one end of the supporting plate (701) is connected to the X-axis moving module (6); the other end of the supporting plate (701) is connected to the housing of a third linear stepping motor (702), to the output end of the third linear stepping motor (702) is connected a fixing plate (703), throughout the entire length of the fixing plate (703) two symmetrically arranged connecting rods (704) penetrate and are fixed, the lower ends of both connecting rods (704) are connected to the same fixing ring (705), the upper end of both the connecting rods (704) is sleeved with a sleeve (706), to the lower end surface of the sleeve (706) is coaxially fixed one end of a cylindrical spring, the other end of the cylindrical spring is connected to the upper surface of the fixing plate (703), and the cylindrical spring is sleeved on the connecting rod (704), both sleeves (706) are connected to the same upper fixed ring (707) by supporting rods; the upper fixed ring (707) is located directly above the lower fixed ring (705), and the panoramic camera (8) is placed between the upper fixed ring (707) and the lower fixed ring (705).

\* \* \* \* \*